United States Patent
Farmahini-Farahani et al.

(10) Patent No.: US 10,705,972 B2
(45) Date of Patent: Jul. 7, 2020

(54) DYNAMIC ADAPTATION OF MEMORY PAGE MANAGEMENT POLICY

(71) Applicant: Advanced Micro Devices, Inc., Sunnyvale, CA (US)

(72) Inventors: Amin Farmahini-Farahani, Santa Clara, CA (US); Alexander D. Breslow, Sunnyvale, CA (US); Nuwan S. Jayasena, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 59 days.

(21) Appl. No.: 15/264,400

(22) Filed: Sep. 13, 2016

(65) Prior Publication Data
US 2018/0074715 A1    Mar. 15, 2018

(51) Int. Cl.
*G06F 12/00* (2006.01)
*G06F 12/1009* (2016.01)
*G06F 13/16* (2006.01)
*G06F 13/00* (2006.01)

(52) U.S. Cl.
CPC .......... *G06F 12/1009* (2013.01); *G06F 13/00* (2013.01); *G06F 13/1668* (2013.01); *Y02D 10/14* (2018.01)

(58) Field of Classification Search
CPC ... G06F 12/1009; G06F 13/1668; G06F 13/00
See application file for complete search history.

(56) References Cited

U.S. PATENT DOCUMENTS

| | | | | |
|---|---|---|---|---|
| 2002/0152368 | A1* | 10/2002 | Nakamura | G06F 9/3832 712/226 |
| 2009/0150624 | A1* | 6/2009 | Resnick | G06F 9/3004 711/155 |
| 2012/0059983 | A1* | 3/2012 | Nellans | G06F 12/0215 711/105 |

OTHER PUBLICATIONS

Frigo, et al., "FFTW: An Adaptive Software Architecture for the FFT", Proceedings of the 1998 IEEE International Conference on Acoustics, Speech and Signal Processing, May 15, 2998, 4 pages.
Volos, et al., "BuMP: Bulk Memory Access Prediction and Streaming", in Proceedings of the 47th Annual IEEE/ACM International Symposium on Microarchitecture, Dec. 13-17, 2014, 13 pages.
Kaseridis, et al., "Minimalist Open-page: A DRAM Page-mode Scheduling Policy for the Many-core Era", Proceedings of the 44th Annual IEEE/ACM International Symposium on Microarchitecture, Dec. 3-7, 2011, 12 pages, ACM, New York, NY, USA.

(Continued)

*Primary Examiner* — Gurtej Bansal
(74) *Attorney, Agent, or Firm* — Kowert Hood Munyon Rankin and Goetzel PC

(57) ABSTRACT

Systems, apparatuses, and methods for determining preferred memory page management policies by software are disclosed. Software executing on one or more processing units generates a memory request. Software determines the preferred page management policy for the memory request based at least in part on the data access size and data access pattern of the memory request. Software conveys an indication of a preferred page management policy to a memory controller. Then, the memory controller accesses memory for the memory request using the preferred page management policy specified by software.

20 Claims, 11 Drawing Sheets

(56) References Cited

OTHER PUBLICATIONS

Awasthi, et al., "Prediction Based DRAM Row-Buffer Management in the Many-Core Era", International Conference on Parallel Architectures and Compilation Techniques, Oct. 10-14, 2011, 2 pages.
Erlingsson, et al., "A Cool and Practical Alternative to Traditional Hash Tables", Proc. 7th Workshop on Distributed Data and Structures (WDAS'06), Jan. 2006, 6 pages.

* cited by examiner

DYNAMIC ADAPTATION OF MEMORY PAGE MANAGEMENT POLICY

The invention described herein was made with government support under contract number DE-AC52-07NA27344 awarded by the United States Department of Energy. The United States Government has certain rights in the invention.

BACKGROUND

Description of the Related Art

A dynamic random-access memory (DRAM) chip includes multiple memory arrays organized as a set of banks. Each bank operates at the granularity of a row, also referred to as a DRAM page. DRAM uses a page-based organization, with the first access to a page activating the page, requiring significant energy and a latency penalty. A typical memory access to a DRAM results in two operations being performed. The first operation is a DRAM page activation, which involves copying an entire DRAM page into the row buffer. The second operation is a transfer of data to or from the row buffer.

Once a page is open, subsequent accesses to that page are served from the row buffer, avoiding the energy and latency cost of a page activation. The row buffer acts as an interface between a small number of external pins and a larger width of the internal memory bank structure. The row buffer captures the full data width of the destructive DRAM read access and then the full data width is restored from the row buffer when the row (or page) is closed. The row buffer can service multiple data transfers from a single, much wider DRAM cell array access. These row buffer (or page mode) accesses amortize the activation power associated with reading the DRAM cell data across multiple data transfers, improving system performance and reducing DRAM power consumption.

A DRAM page policy can be grouped into two classes with respect to page buffer usage. Leaving a page buffer open after every access enables more efficient access to the open page at the expense of increased access delay to other rows in the same DRAM array. Leaving a page buffer open after an access operation is referred to as an "open-page policy". Issuing a single access to a row for a given row activation and then writing the page from the row buffer back to the memory array after the single access is referred to as a "closed-page policy". A closed-page policy reduces the latency for accessing a different row in the same DRAM array but results in a row activation for every access, even for accesses to the same row.

Performance, power and fairness of memory subsystems are affected by the DRAM page management policy. Throughout the areas of data analytics, graph processing, in-memory databases, deep learning, and other applications, managing how data is stored and accessed in memory (e.g., DRAM) is increasingly challenging. Some data accesses benefit from an open-page policy, while other data accesses benefit from a closed-page policy.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
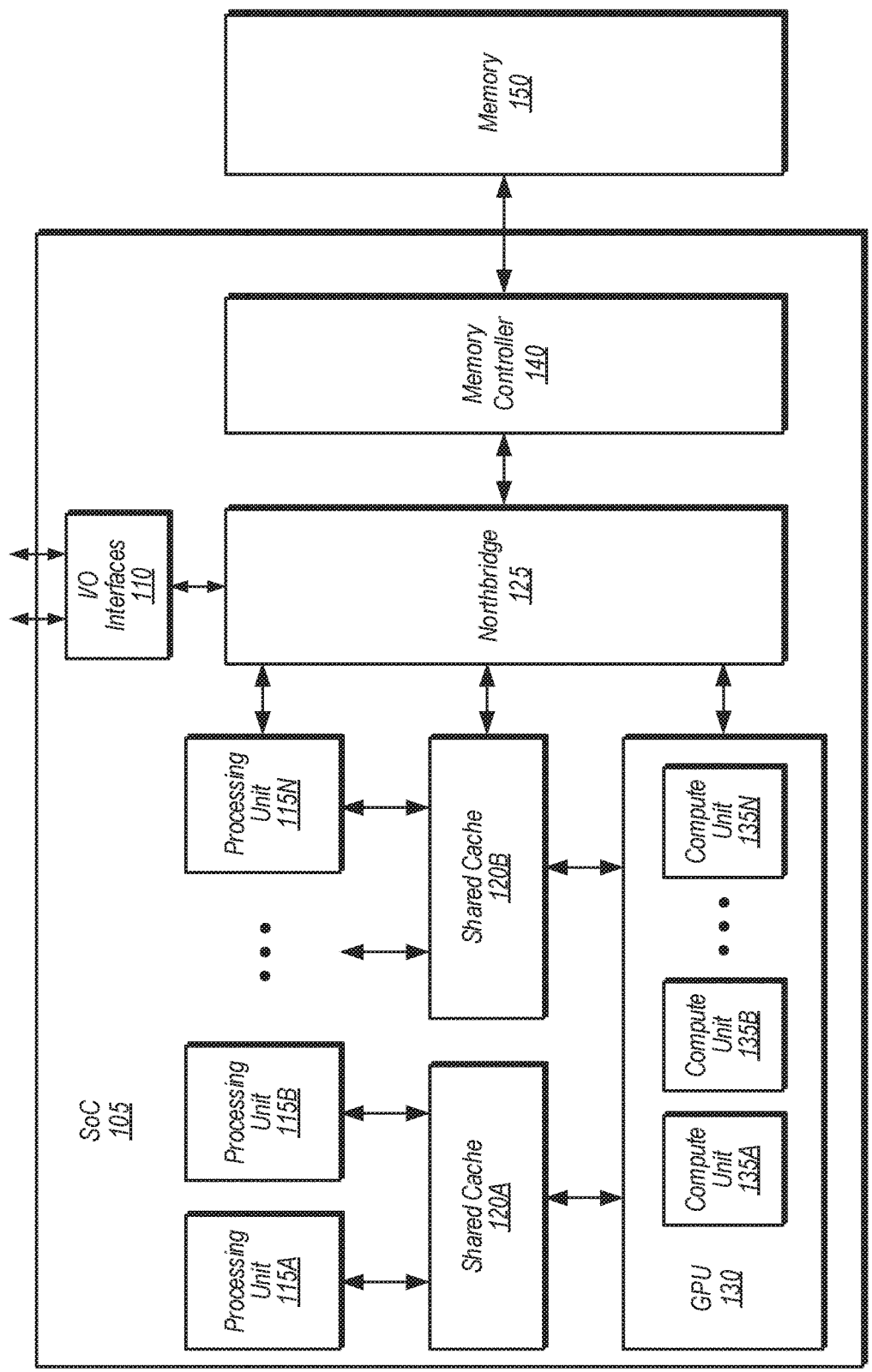
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for determining preferred page management policies by software are disclosed. In one embodiment, a system determines a memory page management policy to utilize when accessing memory for a memory request or multiple memory requests independently of memory page management policies used for other memory requests. In various embodiments, the system includes at least one or more processing units, one or more memory controllers, and one or more memories. In one embodiment, one or more of the memories is a dynamic random access memory (DRAM). In various embodiments, software, a programmer, or a profiler determines the preferred page management policy for memory access instructions based at least in part on the data access size and data access pattern of memory access instructions. In these embodiments, a generated memory request (corresponding to the memory access instruction) can convey an indication of a preferred page management policy for the memory request to a memory controller. Then, the memory controller accesses memory for the memory request using the preferred page management policy specified by software, the programmer, or the profiler.

In various embodiments, any of various mechanisms can be utilized for conveying page management policies to memory controllers. In a first embodiment, the instruction set architecture (ISA) includes different types of memory access instructions which explicitly specify the preferred page management policy. For example, in the first embodiment, the ISA includes different types of load instructions and store instructions. The ISA can include a first type of load instruction specifying a first page management policy, a second type of load instruction specifying a second page management policy, and so on. The ISA can also include a first type of store instruction specifying a first page management policy, a second type of store instruction specifying a second page management policy, and so on. The ISA can also include other specialized instructions beyond just loads and stores.

In a second embodiment, software executing on a processing unit or compute unit configures parameters in the memory controller(s) specifying the preferred page management policy for different regions of memory. In a third embodiment, the preferred page management policy is encoded in page tables, segment registers, or other address translation mechanisms. In a fourth embodiment, software executing on a processing unit or compute unit sends an indication to the memory controller(s) to dynamically change the page management policy for subsequent memory accesses. For example, in the fourth embodiment, a memory controller is configured to utilize a first memory page management policy while accessing the memory for a first memory request. Subsequent to accessing memory for the first memory request, the memory controller receives an indication to dynamically change a memory page management policy. In one embodiment, a first processor is configured to generate the indication based at least in part on a data access size and a data access pattern of one or more memory requests. In response to receiving the indication, the memory controller is configured to utilize a second memory page management policy while accessing the memory for a second memory request. It is assumed for the purposes of this discussion that the second memory page management policy is different from the first memory page management policy. It is noted that in other embodiments, the techniques of any two or more of the previously described embodiments can be combined and implemented together within a single system or apparatus.

Referring now to FIG. 1, a block diagram of one embodiment of a computing system 100 is shown. In one embodiment, computing system 100 includes system on chip (SoC) 105 coupled to memory 150. SoC 105 may also be referred to as an integrated circuit (IC). In one embodiment, SoC 105 includes processing units 115A-N, input/output (I/O) interfaces 110, shared caches 120A-B, northbridge 125, graphics processing unit (GPU) 130, and memory controller 140. SoC 105 can also include other components not shown in FIG. 1 to avoid obscuring the figure. Processing units 115A-N are representative of any number and type of processing units. In one embodiment, processing units 115A-N are central processing unit (CPU) cores. In another embodiment, processing units 115A-N are other types of processing units (e.g., application specific integrated circuit (ASIC), field programmable gate array (FPGA), digital signal processor (DSP)). Processing units 115A-N are coupled to shared caches 120A-B and northbridge 125.

GPU 130 includes compute units 135A-N which are representative of any number and type of compute units. GPU 130 is coupled to shared caches 120A-B and northbridge 125. I/O interfaces 110 are coupled to northbridge 125. I/O interfaces 110 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 110. Such peripheral devices include (but are not limited to) displays, keyboards, mice, printers, scanners, joysticks or other types of game controllers, media recording devices, external storage devices, network interface cards, and so forth.

Processing units 115A-N and GPU 130 are configured to execute instructions of a particular instruction set architecture (ISA), which can include operating system instructions and user application instructions. These instructions include memory access instructions which can be translated and/or decoded into memory access requests or memory access operations targeting memory 150. Processing units 115A-N and compute units 135A-N of GPU 130 can include a memory management unit, translation lookaside buffer (TLB), and/or other logic for performing virtual-to-physical address translations for memory access requests. From processing units 115A-N and compute units 135A-N, if the targeted data is not in a local cache or shared caches 120A-B, memory access requests traverse northbridge 125 and memory controller 140, and then the requests are conveyed from memory controller 140 to memory 150. In another embodiment, northbridge 125 and memory controller 140 are combined into an integrated northbridge and memory controller unit.

In some embodiments, memory 150 includes a plurality of memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth.

Although not explicitly shown in FIG. 1, SoC 105 can also include one or more cache memories that are internal to the processing units 115A-N and compute units 135A-N. In some embodiments, SoC 105 includes shared caches 120A-B that are utilized by processing units 115A-N and compute units 135A-N. In one embodiment, caches 120A-B are part of a cache subsystem including a cache controller.

Some code regions will access one or more data segments that applications benefit from an open-page policy when accessing data in memory, while others benefit from a closed-page policy when they access data in memory. Rather than having memory controller 140 independently determining the memory page management policy, mechanisms can be utilized to manage memory page policy based on information about data spatial locality that is provided by software executing on processing units 115A-N and/or compute units 135A-N.

In areas such as data analytics, graph processing, in-memory databases, and deep learning, having software manage how data is stored and accessed in memory 150 can improve the performance of these applications. By increasing the flexibility of the page management policy via software cues, then applications, libraries, compilers, operating systems, and hypervisors can have further control over how data is accessed in memory. The ability to precisely manage data accesses using software semantics provides optimization opportunities for power and performance improvements over the current state-of-the-art.

In one embodiment, the page management policy is dynamically determined based at least in part on information about data spatial locality that the software executing on processing units 115A-N and compute units 135A-N conveys to memory controller 140. In various embodiments, application working sets can be composed of different data structures. Depending on the data structure organization and the data processing algorithm, data structures are accessed differently by software executing on processing units 115A-N and compute units 135A-N. In one embodiment, the page management policy is selected by software based at least in part on the data access pattern. The term "data access pattern" is defined as the regular or repeated way in which a data structure is accessed. Some data structures are accessed randomly, some are accessed sequentially, some are accessed in a strided fashion, and so on. Software executing on processing units 115A-N and compute units 135A-N can have knowledge of the data access pattern which is not available to memory controller 140. Examples of this knowledge include indications that the compiler statically compiles into the binary or information derived from on- and off-line profiling that directs what policy is used either at compile time or during execution. Software conveys information about the data access pattern to memory controller 140, and memory controller 140 uses this information to set the type of page management policy used for accessing the data structure(s) in memory 150. In one embodiment, the software generates a hint or indication based on the data access pattern, and software can convey the hint or indication to memory controller 140, with the hint or indication specifying to memory controller 140 which page management policy to utilize.

In one embodiment, the page management policy is selected based at least in part on the data access granularity. The term "data access granularity" is defined as the amount of data accessed during a given memory access operation. Data structures can be accessed at different granularities. Some data accesses are fine-grained, meaning that only a few bytes or a few cache lines are accessed each time a processing unit 115A-N or compute unit 135A-N requests data. Pointer chasing is an example of very fine-grained data accesses where reading the value of a pointer takes only a few bytes. Pointer accesses are common in applications such as key lookups, table walks, linked-lists, and tree traversal. Some other data accesses are coarse-grained, meaning that many bytes of data are accessed each time a processing unit 115A-N or compute unit 135A-N requests data. Examples of coarse-grained accesses are reading web page metadata and scanning database rows. For example, a web search engine uses a hash table to quickly retrieve metadata pages relevant to query terms. While metadata pages are accessed at coarse granularity, finding the metadata pages can require performing a sequence of fine-grained pointer chasing operations through a hash bucket.

Both data access pattern and data access granularity affect spatial locality. Thus, some data accesses exhibit high spatial locality, while other data accesses have little to no spatial locality. Accesses with high spatial locality benefit from the open-page policy, while accesses with little spatial locality benefit from the closed-page policy. In various embodiments, software cues are generated by a compiler, software developer, or profile and are annotated or included in the application code. When the application is executed by processing units 115A-N and/or compute units 135A-N, the software cues cause memory controller 140 to use a specific page management policy according to data spatial locality and/or application requirements. The software cues generated can be based at least in part on application requirements (e.g., low latency, performance per watt, performance, throughput). In other embodiments, processing units 115A-N and/or compute units 135A-N can execute self-aware code with specialized hardware support. In one embodiment, the code can utilize on-the-fly compilation or recompilation in response to measurements collected from performance counters. In another embodiment, the code can switch between precompiled variants of the same routine based on on-line or off-line profiling of tasks. In a further embodiment, any of the above mechanisms could be combined and implemented together. The mechanisms for optimizing memory page management policy disclosed herein can improve performance, power, and fairness in memory subsystems.

In various embodiments, computing system 100 can be a computer, laptop, mobile device, server, web server, cloud computing server, storage system, or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
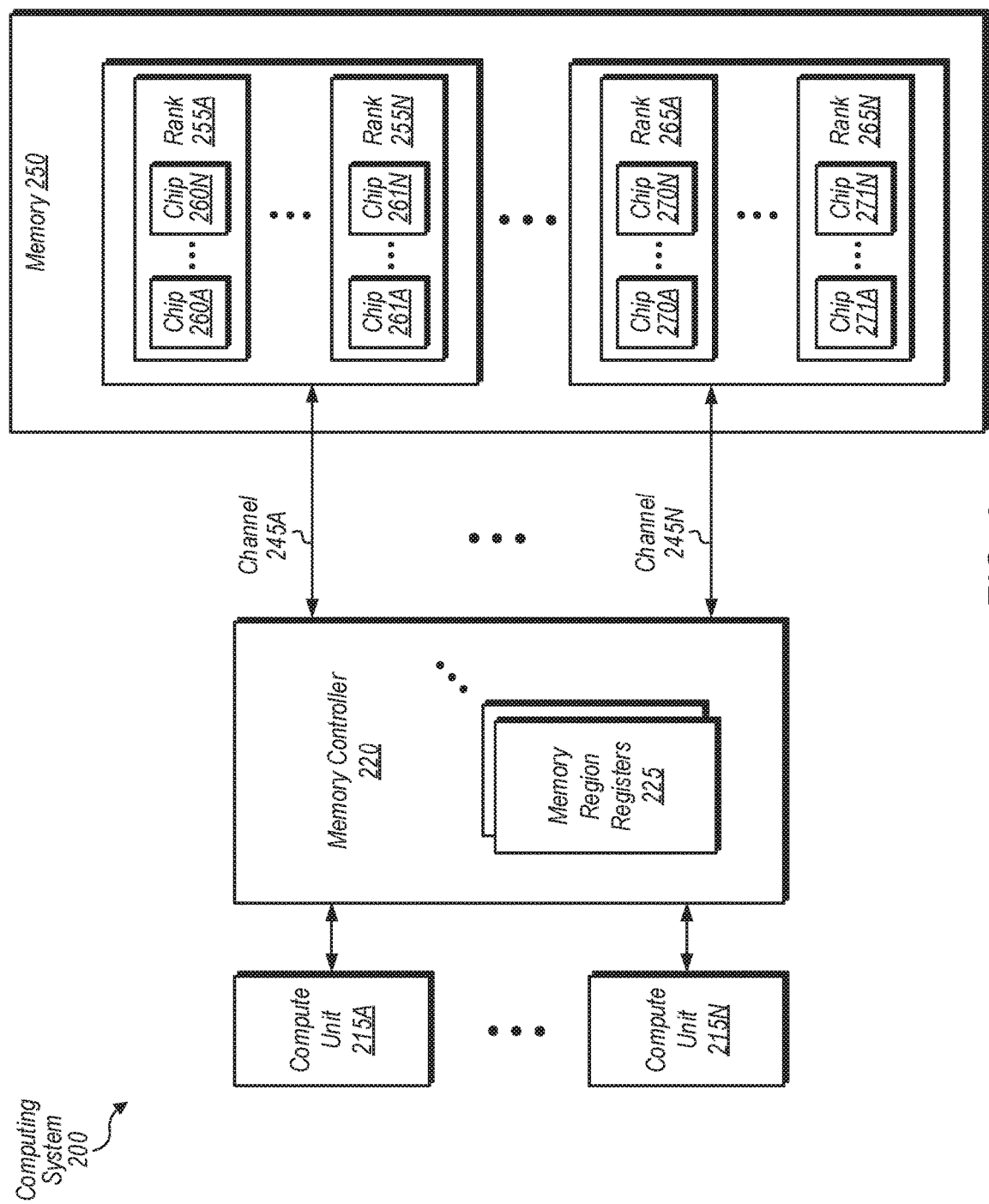
FIG. 2 is a block diagram of another embodiment of a computing system.

Turning now to FIG. 2, a block diagram of another embodiment of a computing system 200 is shown. Computing system 200 includes compute units 215A-N, which are representative of any number and type of compute units (e.g., CPU, GPU, accelerator). In various embodiments, one or more of compute units 215A-N can be implemented in a separate package from memory 250 or in a processing-near-memory architecture implemented in the same package as memory 250.

Compute units 215A-N are coupled to memory controller 220. Although not shown in FIG. 2, one or more units can be placed in between compute units 215A-N and memory controller 220. These units can include a fabric, northbridge, or other components. Compute units 215A-N are configured to generate memory access requests targeting memory 250. Memory access requests are conveyed from compute units 215A-N to memory controller 220, and then the requests are conveyed from memory controller 220 to memory 250 via channels 245A-N. In one embodiment, memory 250 is used to implement a RAM. The RAM implemented can be SRAM, DRAM or other type of memory.

Channels 245A-N are representative of any number of memory channels for accessing memory 250. On channel 245A, each rank 255A-N of memory 250 includes any number of chips 260A-N with any amount of storage capacity, depending on the embodiment. Each chip 260A-N of rank 255A and each chip 261A-N of rank 255N includes any number of banks, with each bank including any number of storage locations. Similarly, on channel 245N, rank 265A of memory 250 includes any number of chips 270A-N and rank 265N of memory 250 include any number of chips 271A-N with any amount of storage capacity. In other embodiments, the structure of memory 250 can be organized differently among ranks, chips, banks, etc.

In one embodiment, memory controller 220 includes memory region registers 225, which are representative of any number of memory regions. Each memory region register 225 specifies the boundaries of a corresponding memory region. Each memory region register 225 also specifies the preferred page management policy to be utilized by memory controller 220 when performing accesses to addresses within the corresponding memory region. Software executing on compute units 215A-N programs the boundaries and preferred page management policy information into memory region registers 225. Memory controller 220 follows the policy dictated by software in memory region registers 225 when performing memory accesses. In other embodiments, software sends other types of indications to memory controller 220 to cause memory controller 220 to utilize specific page management policies when accessing memory 250.

Memory controller 220 includes hardware support for a software-directed memory access policy. In various embodiments, a programmer, compiler, or profiler generates software cues and annotates the software code. In one embodiment, the software cues are generated based on the data access type and data spatial locality of memory access instructions. The software code is then executed on compute units 215A-N, and the data access characteristics are conveyed to memory controller 220. Memory controller 220 uses the cues to manage the page access policy for memory 250.

Some data sets are accessed randomly in small chunks (fine-grain data). These data sets do not show spatial locality. Due to the random access pattern, it is beneficial to access these data sets using a closed page policy. Accordingly, software programs memory controller 220 to access these data sets using a closed page policy. For example, in key-value database applications, keys are usually small in size (less than or equal to 64 bytes) and key accesses are distributed across a hash table (and thus a large memory address space). Thus, when generating and conveying operations for performing these fine-grained accesses to memory 250, software programs memory controller 220 to implement a closed page policy.

Other data sets can be accessed sequentially in large chunks (coarse-grain data). These data sets show high spatial locality. Due to their sequential access pattern, it is beneficial to access these data sets using an open-page policy. For example in key-value store applications, values usually have large sizes and values are either accessed sequentially or adjacent data within values are accessed in a short period of time. Thus, software programs memory controller 220 to use an open-page policy for accessing values in key-value store applications.

In one embodiment, the page management policy is set by software based on the data access size and the data access pattern. Depending on the type of access, software can provide memory controller 220 with cues to use either a closed page policy, an open-page policy, a hybrid policy, or a hardware-directed policy. In one embodiment, programming languages are extended via the addition of keywords or other language-level annotations to allow developers and applications to declare the anticipated memory access characteristics of specific data objects. In one embodiment, libraries are extended to provide different memory allocation routines (e.g., different types of malloc( ) in C/C++) or additional flags to memory allocation routines to identify data objects with different access characteristics. Domain-specific languages or libraries can infer the anticipated access characteristics of data objects based on domain knowledge and application-level context. Applications can use intrinsics or other similar techniques to issue memory accesses that convey information about the access pattern.

In one embodiment, compile-time analysis can be used to determine the access characteristics of memory accesses and to select instructions or embed other annotations in the compiled code to indicate the anticipated access pattern or corresponding memory page management policy. In one embodiment, application- and library-level profiling can be used to determine the access characteristics of data objects or specific accesses and annotate them appropriately.

Depending on the embodiment, there are a variety of ways to convey information about the preferred page management policy from software executing on compute units 215A-N to memory controller 220. Compute units 215A-N can inform memory controller 220 if the data being accessed is a fine-grain data object with a random access pattern (as with keys in key-value store applications) or a coarse-grain data object with a relatively sequential access pattern (as with values in key-value store applications). This information is captured by software and conveyed to memory controller 220 using one or more of a variety of different techniques.

In one embodiment, the instruction set architecture (ISA) supports different types of instructions that indicate the type of page management policy which should be used by memory controller 220 when performing an access to the memory location. Memory controller 220 is informed by the compute units 215A-N of the access characteristics by using different memory access instructions (e.g., different types of loads, stores). For example, when executing a key-value store application, a compute unit could specify whether the compute unit is accessing short key objects with poor spatial locality or larger value objects with greater spatial locality. For a memory request sent by a compute unit 215A-N to memory controller 220, the compute-unit 215A-N transfers some information about the access type to memory controller 220. This information can be encoded using different operation codes (or opcodes) or via one or more bits in the instruction specifying what page management policy should be used for the requested data. For example, in one embodiment an instruction may include one or more bits that are reserved for the purpose of specifying a page management policy (e.g., a page management policy field). As used herein, the term "opcode" is defined as the portion of a machine language instruction that specifies the operation to be performed. Specifications and format of opcodes are typically defined in an instruction set architecture (ISA).

In one embodiment, the relevant page management policy information is extracted from each instruction during instruction decode and is propagated through the memory access pipeline with each memory access. For key-value store applications, a compute unit 215A-N can use special memory instructions that specify an open page policy for values and specify a closed page policy for keys. A similar approach can be utilized for other applications where there is a mix of small and large access granularity.

In one embodiment, software can program parameters in memory controller 220 specifying the optimized page access mode for different regions of memory 250. For example, a compute unit 215A-N can specify the boundaries of a memory region (e.g., start address, end address) and preferred page mode in a memory region register 225 as previously described. Transferring the region boundaries to memory controller 220 can be implemented by writing into memory region registers 225 or using specialized instructions. In one embodiment, page management control information is extracted by determining what region of memory 250 is being accessed, and then the page management control information can be propagated through the memory access pipeline with each memory access.

In one embodiment, in the case of key-value store applications, a compute unit 215A-N can specify the boundaries of the memory region used for storing keys. The compute unit 215A-N can also specify the boundaries of the memory region used for storing values. The compute unit 215A-N can then indicate the desired page management policy for the key region of memory 250 and the value region of memory 250 separately. In other embodiments, compute units 215A-N can specify three or more separate regions of memory 250, with each region having its own page management policy. These regions can correspond to other types of regions which are different from the key and value regions described in the above example.

In other embodiments, access characteristic information specified on a per-data-structure basis can be encoded in page tables, segment registers, or other address translation mechanisms. For example, in one embodiment, each page table entry (PTE) contains a field that specifies the anticipated access type and/or the preferred page management policy. Alternatively, a set of pages or segments can be set aside for each class of access, and data objects that are specified for that access are allocated in those pages or segments. In one embodiment, the page management policy information is extracted from the appropriate PTE (or its copy in a translation lookaside buffer (TLB)) during address translation, and that information is propagated through the memory access pipeline with each memory access. The memory access pipeline includes the logic that a memory access instruction or request traverses between a compute unit 215A-N and the target storage location in memory 250.

In some embodiments, software cues can be propagated with each memory request through the memory access pipeline (if communicated via an instruction or a page table entry). In other embodiments, software cues can program separate memory regions by writing into memory region registers 225 if page management policies are applied on a memory region basis. Any one or more of the approaches described herein can also be combined with techniques that dynamically determine page management policy in hardware at the memory controller 220. For example, one of the access characteristics types specified by software can be a hardware-determined type. A hardware-determined type indication can be applied to a subset of data objects or a subset of accesses for which the software is unable to provide hints or directives with sufficient confidence.

In another embodiment, a hybrid page management policy is utilized by software and memory controller 220. Based on data access size and data access pattern, software can provide cues to memory controller 220 to keep a given memory page open for a certain number of accesses or a time duration (e.g., number of cycles) before closing the given memory page. The hybrid page management policy can be useful in cases when the requested data objects are larger than memory access granularity but data objects are accessed randomly. Using the key-value store as an example, if memory data access granularity is 32 bytes and buckets of keys are stored contiguously in 64-byte chunks, after every two memory accesses, the row buffer could be closed since key accesses do not exhibit spatial locality beyond a bucket. As another example, if four 8-byte keys are packed in a memory block and accessed consecutively (such as in some types of hash tables), then after performing four 8-byte accesses to a single memory block, the page could be closed.

In one embodiment, system 200 utilizes dynamic run-time profiling to determine an optimal page management policy scheme while executing a given software application. In this embodiment, system 200 utilizes different page management policy schemes while executing iterations of the given software application and measures performance, energy efficiency, and/or other metrics for each iteration and each page management policy scheme. Each page management policy scheme can utilize different page management policies for certain access types, data objects, and/or regions of memory. A variety of page management policies can be tried to determine the optimal page management policy scheme for the given software application.

For example, system 200 utilizes a first page management policy scheme for a first iteration of the given software application and records measurements for the first iteration. Then, system 200 utilizes a second page management policy scheme for a second iteration of the given software application and records measurements for the second iteration, system 200 utilizes a third page management policy scheme for a third iteration of the given software application and records measurements for the third iteration, and so on. Then, system 200 chooses the page management policy scheme with the best performance, energy efficiency, and/or other metrics and utilizes this page management policy scheme for subsequent iterations of the given software application.

In one embodiment, another form of dynamic run-time profiling can be utilized where the system 200 executes the application and monitors hardware performance statistics such as the number of memory accesses that caused a new DRAM page to be activated, the number of memory accesses that were satisfied from already activated DRAM pages, and the number of memory accesses that caused a currently active DRAM page to be closed. Such statistics can be monitored for the entire application, for segments or phases of the application, or for specific data structures or address ranges of the application. The software can then utilize the information from these statistics to determine appropriate memory page management policies.

It is noted that the above descriptions provided in the context of DRAM open and closed page management policies are merely examples of a single memory type and corresponding page management policies. In other embodiments, the methods and mechanisms described herein can be utilized with other memory types that support different types of page management policies.

Figure 3:
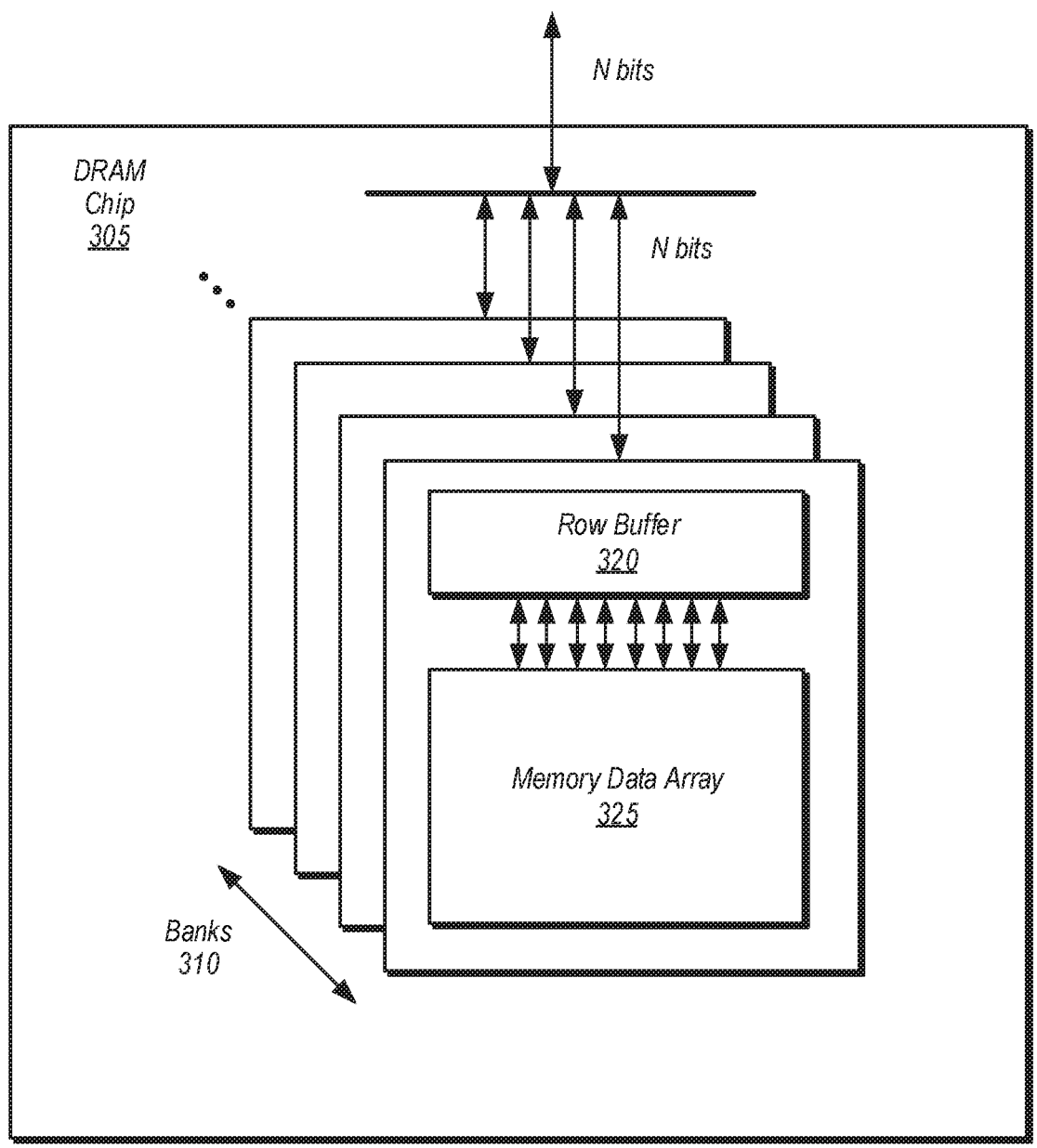
FIG. 3 is a block diagram of one embodiment of a DRAM chip.

Referring now to FIG. 3, a block diagram of one embodiment of a DRAM chip 305 is shown. In one embodiment, the components of DRAM chip 305 are included within chips 260A-N and chips 270A-N of memory 250 (of FIG. 2). DRAM chip 305 includes an N-bit external interface and an N-bit interface to each bank of banks 310, with N being any positive integer, and with N varying from embodiment to embodiment. In some cases, N is a power of two (e.g., 8, 16). Additionally, banks 310 are representative of any number of banks which can be included within DRAM chip 305, with the number of banks varying from embodiment to embodiment.

As shown in FIG. 3, each bank 310 includes a memory data array 325 and a row buffer 320. The width of the interface between memory data array 325 and row buffer 320 is typically wider than the width of the N-bit interface out of chip 305. Accordingly, if multiple hits can be performed to row buffer 320 after a single access to memory data array 325, this can increase the efficiency and decrease latency of subsequent memory access operations performed to the same row of memory array 325. However, there is a penalty when writing the contents of row buffer 320 back to memory data array 325 prior to performing an access to another row of memory data array 325.

Figure 4:
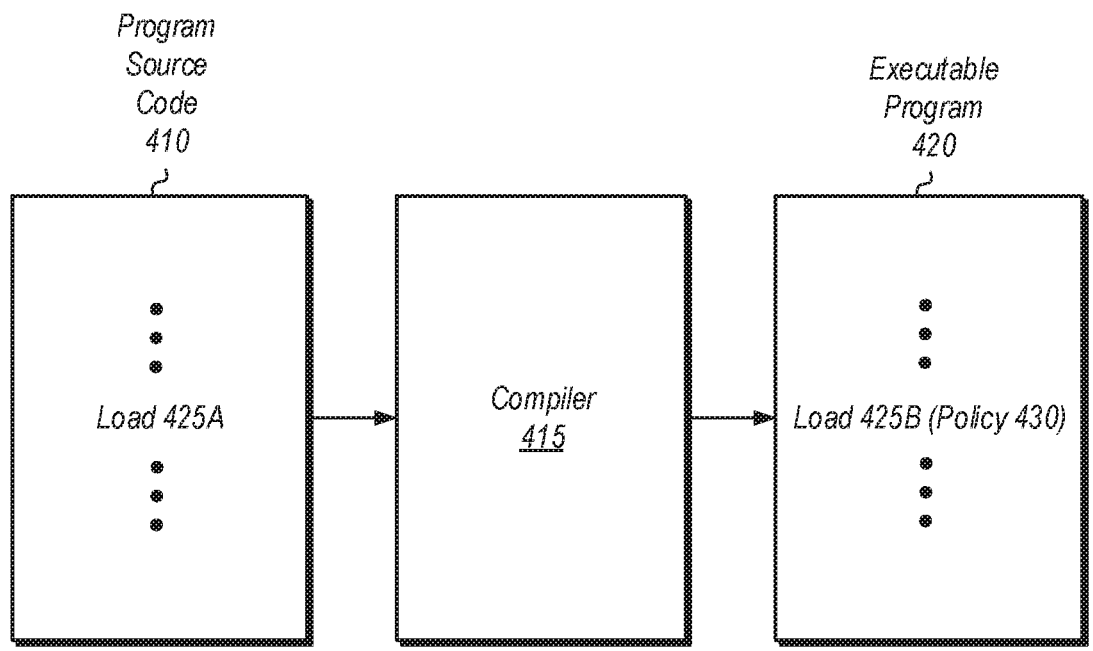
FIG. 4 is a block diagram of one embodiment of a compiler.

Turning now to FIG. 4, a block diagram of one embodiment of a compiler 415 is shown. In one embodiment, compiler 415 processes (or compiles) program source code 410 into executable program 420. Program source code 410 can be written in any of various types of computing languages, depending on the embodiment. Executable program 420 is executable on a given processing unit (e.g., one or more of processing units 110A-N of FIG. 1, one or more of compute units 130A-N).

In one embodiment, when compiler 415 detects memory access instructions in program source code 410, compiler 415 analyzes the memory access instruction to determine the optimal page management policy to be used when the corresponding memory access operation is performed to memory. In one embodiment, compiler 415 utilizes the data size, data pattern, and/or one or more other factors to determine the preferred page management policy for detected memory access instructions in program source code 410. Then, compiler 415 generates a preferred page management policy indication for each memory access operation in executable program 420. In one embodiment, when executable program 420 is executed by one or more processing units, the preferred page management policy indication is conveyed with the memory access operation through the memory access pipeline to the memory controller (e.g., memory controller 220 of FIG. 2). The memory controller then utilizes the indication to set the page management policy for the memory access operation when performing an access to memory for the memory access operation.

In the example shown for program source code 410, program source code 410 includes load 425A, which is representative of a load instruction. Compiler 415 converts load 425A into load operation 425B, with load operation 425B including a policy indication 430 which represents the preferred page management policy for load operation 425B. The policy indication 430 can be specified in one or more bits of load operation 425B, or policy indication 430 can be specified in the opcode of load operation 425B. The memory controller receives policy indication 430 and utilizes a page management policy specified by policy indication 430 when accessing memory for load operation 425B.

Figure 5:
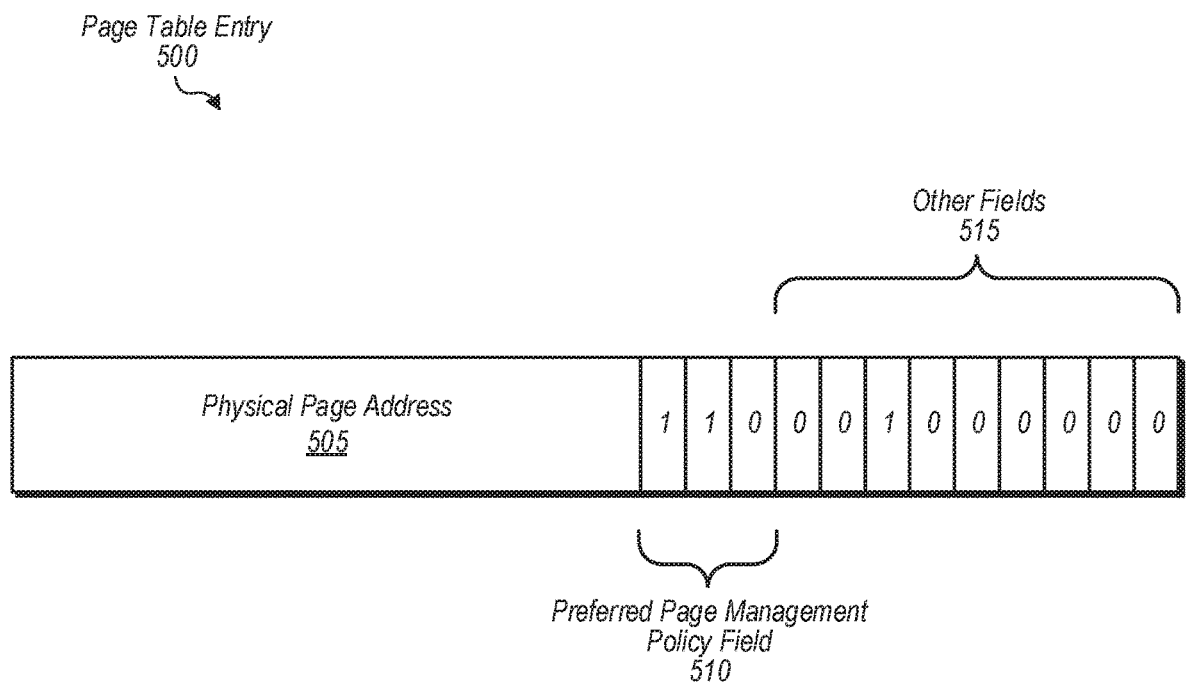
FIG. 5 is a diagram of one embodiment of a page table entry.

Referring now to FIG. 5, a diagram of one embodiment of a page table entry 500 is shown. Page table entry 500 is representative of any type and structure of page table entry that can be utilized to perform a virtual-to-physical address translation for accesses to memory. In one embodiment, page table entry 500 is also utilized to specify the preferred page management policy for a given memory access operation. The preferred page management policy is retrieved from preferred page management policy field 510 of page table entry 500. Preferred page management policy field 510 can includes any number of bits to encode the policy field information, with the number of bits and encoding scheme varying from embodiment to embodiment. It is noted that preferred page management policy field 510 can utilize bits stored in non-contiguous locations throughout page table entry 500 rather than being stored within contiguous bits of page table entry 500 as indicated in FIG. 5. Page table entry 500 also includes physical page address 505 and other fields 515. Physical page address 505 and other fields 515 are utilized to perform the translation for the corresponding memory access operation.

Figure 6:
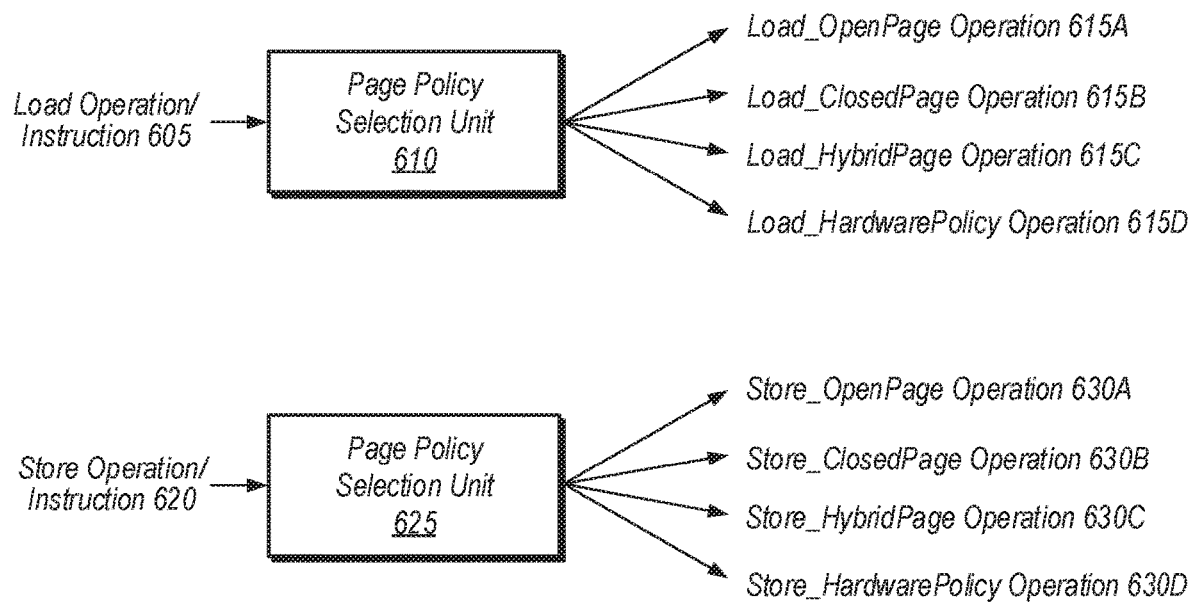
FIG. 6 is a diagram of one embodiment of the conversion of memory access instructions.

Turning now to FIG. 6, a diagram of one embodiment of the conversion of memory access instructions is shown. For example, a load operation/instruction 605 can be converted by a page policy selection unit 610 into one of load operations 615A-D. Page policy selection unit 610 represents any suitable combination of software and/or hardware. Each of load operations 615A-D is representative of a different type of load opcode. Load_OpenPage operation 615A represents a load operation that will access memory using an open page policy. This will result in the memory page remaining open after the access is performed to the corresponding row buffer during the access to memory.

Load_ClosedPage operation 615B represents a load operation for which the memory controller will use a closed page policy when accessing memory. This will result in memory page being closed after the access is performed to the corresponding row buffer. Load_HybridPage operation 615C represents a load operation that includes an indication of an access size and a number of accesses (or a time duration) which will determine which type of page management policy will be utilized during the access. Depending on the size of the access and the size of the row buffer in the target memory, the memory controller can select an open page policy or a closed page policy to utilize when performing the access. Load_HardwarePolicy operation 615D represents a load operation that defers the preferred policy decision to the memory controller. Load_HardwarePolicy operation 615D can be utilized by the programmer or the software when the programmer or software unit is unable to determine the preferred page management policy for the load operation. In these cases, the programmer or software unit lets the memory controller determine which page management policy is utilized for the load operation. Similar to the above, a store operation/instruction 620 can be converted by a page policy selection unit 625 into one of store operations 630A-D. Store_OpenPage operation 630A, Store_ClosedPage operation 630B, Store_HybridPage operation 630C, and Store_HardwarePolicy operation 630D are processed in a similar manner to the respective load operations 615A-D. It is noted that in other embodiments, a single load or store instruction can be converted into other numbers of load or store operations. In some embodiments, even if the instructions (e.g., 615A-D and 630A-D) hit in the cache, an indication is still sent to the memory controller(s) for page management. In other embodiments, only instructions that miss in the cache would change the page management policy in the memory controller(s). In some embodiments, the instructions can change the page management policy of a single memory controller or multiple memory controllers. In addition to specialized loads and stores, additional instructions can be added to the ISA that control the memory management policy for a page or a memory region. These instructions can execute before or after the load and store instructions that access said page or region depending on their placement within the program's text and how the hardware reorders them.

In one embodiment, a programmer can specify one of load operations 615A-D in the program source code to indicate which type of page management policy should be utilized by the memory controller (e.g., memory controller 220 of FIG. 2) when accessing memory for the operation. In another embodiment, the programmer specifies load instruction 605 in the program source code, and then a compiler converts load instruction 605 into one of load operations 615A-D. In this embodiment, page policy selection unit 610 is a compiler. In a further embodiment, a memory management unit, translation lookaside buffer, or other logical unit interprets load instruction 605 as one of load operations 615A-D by retrieving the specified page management policy from the page table entry associated with load instruction 605. In this embodiment, page policy selection unit 610 is a memory management unit, translation lookaside buffer, or other logical unit.

Figure 7:
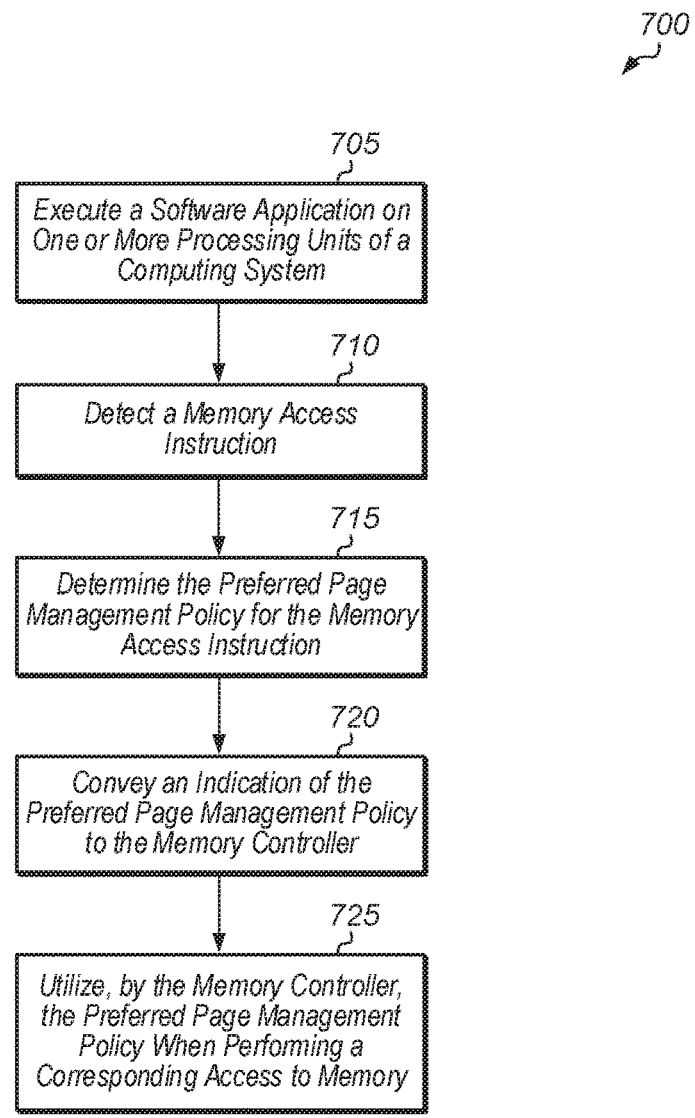
FIG. 7 is a generalized flow diagram illustrating one embodiment of a method for generating page management policy cues in software.

Referring now to FIG. 7, one embodiment of a method 700 for generating page management policy cues in software is shown. For purposes of discussion, the steps in this embodiment and those of FIGS. 8-11 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 700.

A software application executes on one or more processing units of a computing system (block 705). In one embodiment, the computing system includes one or more processing units coupled to a northbridge, with the northbridge coupled to a memory controller, and the memory controller coupled to a memory. In one embodiment, the memory is a DRAM. In another embodiment, the memory includes any of various other types of memory devices.

A processing unit detects a memory access instruction (block 710). In one embodiment, the memory access instruction is a load instruction or store instruction targeting system memory. In response to detecting the memory access instruction, the processing unit determines the preferred page management policy for the memory access instruction (block 715). In one embodiment, the memory access instruction includes an indication of the preferred memory page management policy. In one embodiment, the indication is specified by a subset of instruction bits from the instruction. For example, in various embodiments, software, a programmer, a compiler, or a profiler can determine the preferred page management policy for the memory access instruction based at least in part on the data access size and data access pattern of the memory access instruction. Next, the processing unit conveys an indication of the preferred page management policy to the memory controller (block 720). Any of the indications described herein can be conveyed by the processing unit. Then, the memory controller utilizes the preferred page management policy when performing a corresponding access to memory (block 725). After block 725, method 700 ends.

Figure 8:
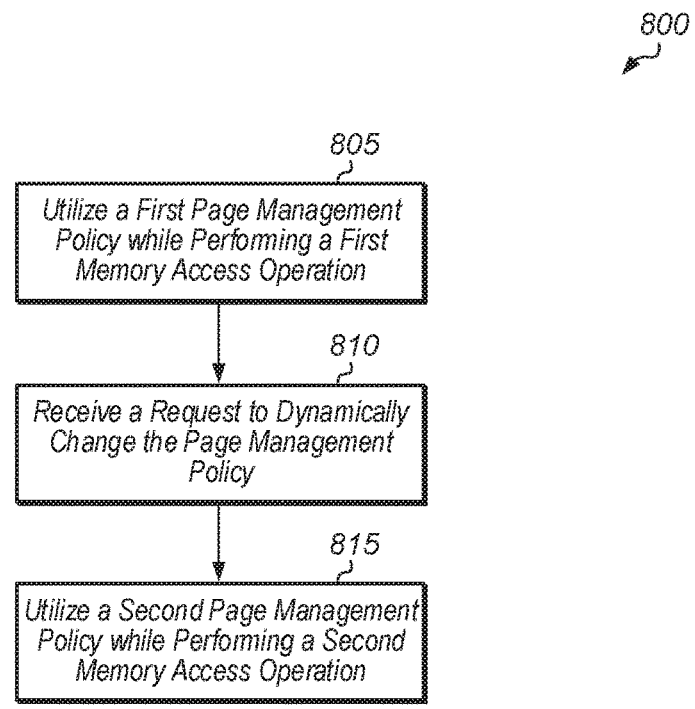
FIG. 8 is a generalized flow diagram illustrating one embodiment of a method for dynamically adjusting page management policies.

Turning now to FIG. 8, one embodiment of a method 800 for dynamically adjusting page management policies is shown. In the example shown, a memory controller utilizes a first page management policy while performing a first memory access operation (block 805). Next, the memory controller receives a request to dynamically change the page management policy subsequent to performing the first memory access operation (block 810). Depending on the embodiment, the request can be an indication included within a second memory access operation, an indication retrieved from a memory region register, or other type of request or indication. In one embodiment, software executing on the one or more processors is configured to generate the request based at least in part on a data access size and data access pattern of one or more memory access operations being generated. Next, the memory controller utilizes a second memory page management policy for a second memory access operation (block 815). In one embodiment, the second memory page management policy can be different from the first memory page management policy. After block 815, method 800 ends.

In one embodiment, the first memory access operation is generated by a key-value store application and targets a key, and the second memory access operation is generated by the key-value store application and targets a value. In this embodiment, the first page management policy is a closed page policy and the second page management policy is an open page policy. In other embodiments, the first page management policy and the second page management policy are any of various other types of page management policies.

Figure 9:
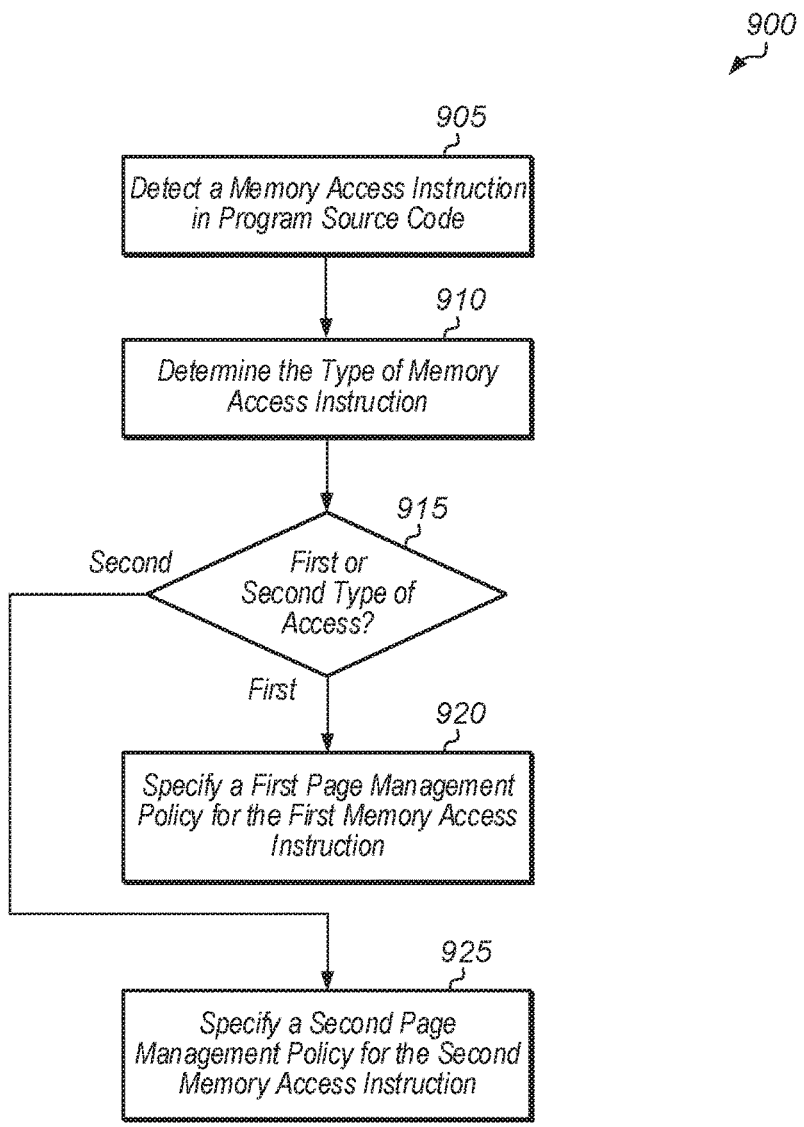
FIG. 9 is a generalized flow diagram illustrating one embodiment of a method for specifying, by a compiler, page management policies.

Referring now to FIG. 9, one embodiment of a method 900 for a compiler specifying page management policies is shown. In the example shown, a compiler detects a memory access instruction in program source code (block 905). In response to detecting the memory access instruction, the compiler determines the type of memory access instruction (block 910). The compiler can determine the type of the memory access instruction based at least in part on the data access size and data access pattern of the memory access instruction and previous or subsequent memory access instructions. If the compiler determines the memory access instruction is a first type of access (conditional block 915, "first" leg), then the compiler specifies a first page management policy for the memory access instruction (block 920). The compiler can encode the first page management policy for the memory access instruction in an executable binary. In one embodiment, the first type of memory access instruction corresponds to a fine-grained access to memory, and the first page management policy is a closed page policy.

If the compiler determines the memory access instruction is a second type of access (conditional block 915, "second" leg), then the compiler specifies a second page management policy for the memory access instruction (block 925). In one embodiment, the second page management policy can be different from the first page management policy. In one embodiment, the second type of memory access instruction corresponds to a coarse-grain access to memory, and the second page management policy is an open page policy. It is noted that in other embodiments, there can be more than two different types of memory access instructions and more than two different types of page management policies. After blocks 920 and 925, method 900 ends. Generally speaking, method 900 illustrates one example of a compiler precompiling page management policy directives within a binary prior to execution of the binary. In other embodiments, other methods for using a compiler to generate preferred page management policy indications can be utilized. One such method would be just-in-time (JIT) compilation that generates code with indications for memory page management based on metrics gathered from the program's partial execution up until that point.

Figure 10:
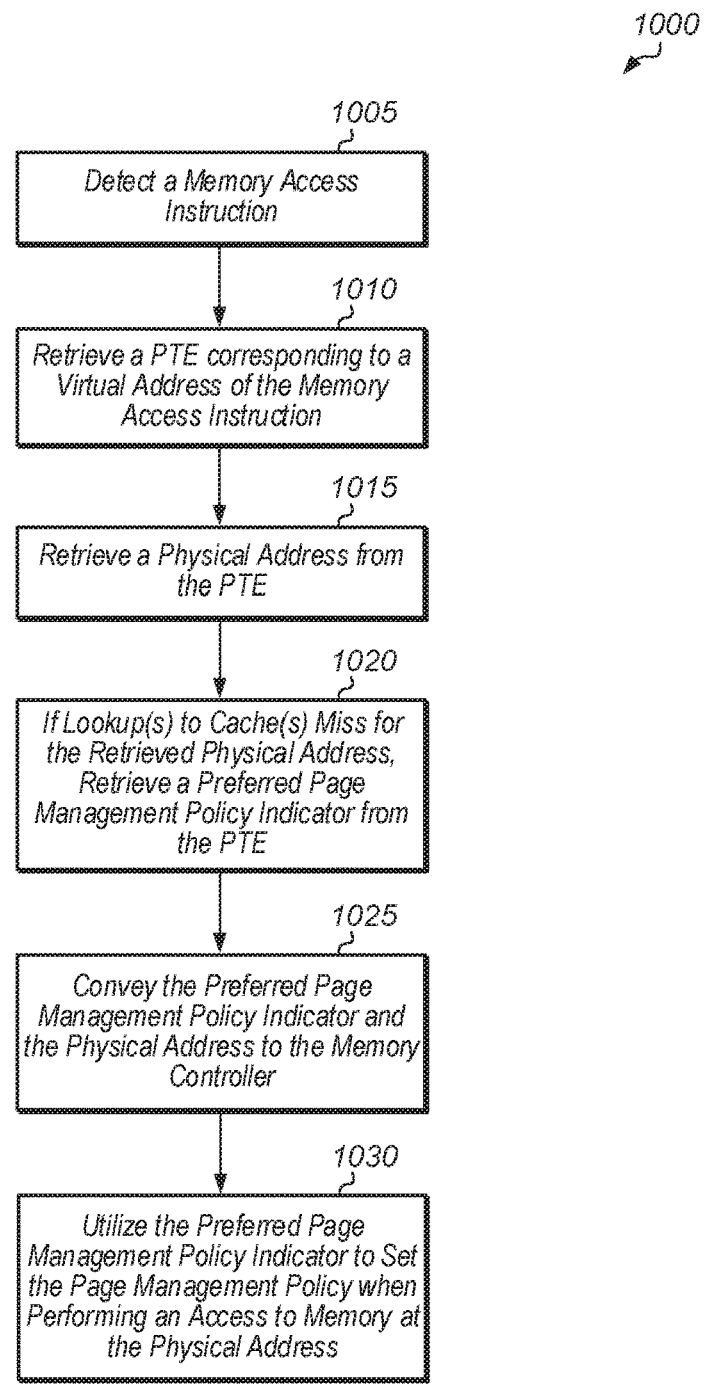
FIG. 10 is a generalized flow diagram illustrating one embodiment of a method for determining page management policies.

Turning now to FIG. 10, one embodiment of a method 1000 for determining page management policies is shown. In the example shown, a memory access instruction is detected by a processing unit (block 1005). In response to detecting the memory access operation, a page table entry (PTE) corresponding to a virtual address of the memory access instruction is retrieved (block 1010). The PTE can be retrieved from a TLB or from a page table stored in memory. Next, a physical address is retrieved from the PTE (block 1015). If lookup(s) to the processing unit's cache(s) miss for the retrieved physical address, then a preferred page management policy indicator is retrieved from the PTE (block 1020). Then, the preferred page management policy indicator and the physical address are conveyed to the memory controller (block 1025). Then, the memory controller utilizes the preferred page management policy indicator to set the page management policy when performing an access to memory at the physical address (block 1030). After block 1030, method 1000 ends.

Figure 11:
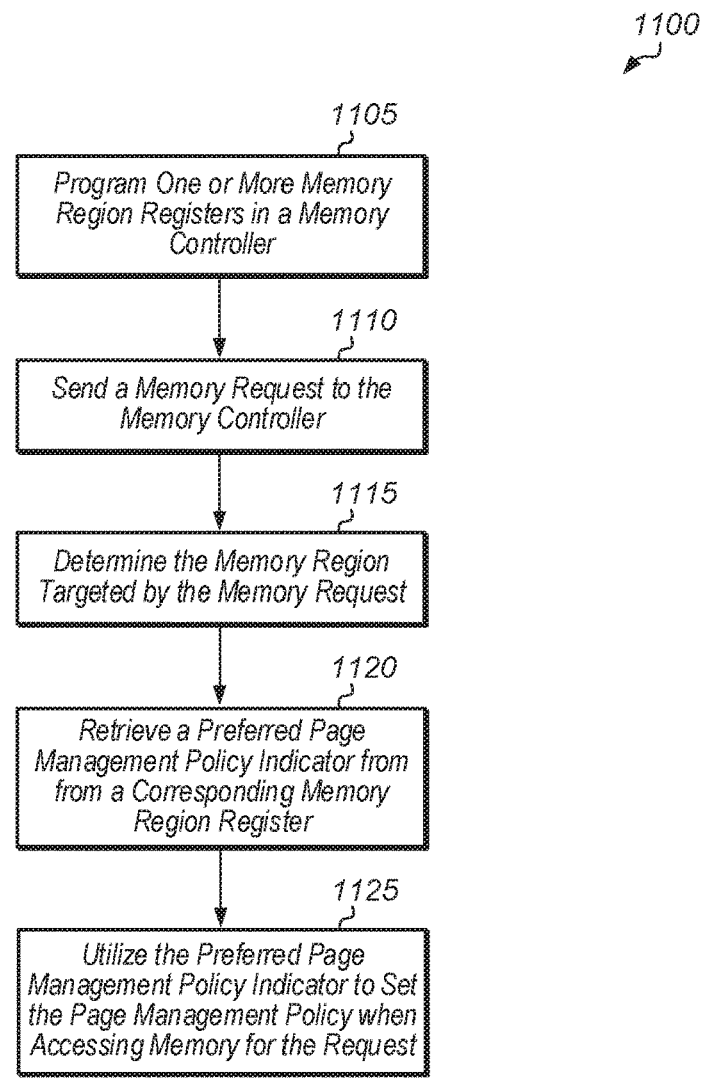
FIG. 11 is a generalized flow diagram illustrating one embodiment of a method for utilizing memory region registers.

Referring now to FIG. 11, one embodiment of a method 1100 for utilizing memory region registers is shown. In the example shown, software executing on a processing unit programs one or more memory region registers in the memory controller (block 1105). The memory region register(s) include region boundaries, a preferred page management policy indicator, and/or one or more other parameters for each memory region. Next, the processing unit sends a memory request to the memory controller (block 1110). In response to receiving the memory request, the memory controller determines the memory region targeted by the memory request (block 1115). Next, the memory controller retrieves a preferred page management policy indicator from a corresponding memory region register (block 1120). Then, the memory controller utilizes the preferred page management policy indicator to set the page management policy when accessing memory for the request (block 1125). After block 1125, method 1100 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. The non-transitory computer readable storage medium can include volatile or non-volatile memory devices, depending on the embodiment. In other embodiments, the program instructions can be stored on a transitory medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
one or more processors;
one or more memories storing a given computer program that includes a first memory access instruction, wherein the first memory access instruction includes, prior to execution of the given computer program, a first indication of a preferred memory page management policy; and
one or more memory controllers;
wherein the system is configured to:
execute the first memory access instruction on a first processor of the one or more processors;
generate a first memory request responsive to executing the first memory access instruction, wherein the first memory request includes a second indication of the preferred memory page management policy;
convey the first memory request to a memory controller of the one or more memory controllers; and
utilize the preferred page management policy when accessing a memory for the first memory request.

2. The system as recited in claim 1, wherein:
the system is configured to retrieve a third indication from a page table entry responsive to executing a second memory access instruction, wherein the third indication from the page table entry specifies a preferred memory page management policy for performing an access to the memory corresponding to the second memory access instruction;
the system is configured to convey the third indication retrieved from the page table entry to the memory controller; and
the memory controller is configured to use the preferred memory page management policy specified by the third indication retrieved from the page table entry when performing the access to the memory.

3. The system as recited in claim 1, wherein:
the system is configured to program memory region registers in a memory controller to specify a preferred memory page management policy for each region of the memory;
the memory controller is configured to:
identify a region of the memory targeted by a second memory request responsive to receiving the second memory request;
retrieve a preferred memory page management policy from a memory region register corresponding to the region targeted by the second memory request; and
perform an access to the memory for the second memory request utilizing the preferred memory page management policy retrieved from the memory region register.

4. The system as recited in claim 1, wherein the memory controller is configured to:
receive a fourth indication to dynamically change a memory page management policy subsequent to accessing the memory for the first memory request; and
use a second memory page management policy while accessing the memory for a second memory request.

5. The system as recited in claim 1, wherein:
a second preferred memory page management policy for a second memory access instruction in the given computer program is encoded in an executable binary in the given computer program;
the first processor is configured to:
detect the second preferred memory page management policy in response to executing the second memory access instruction; and
convey the second preferred memory page management policy with a corresponding memory request to the memory controller; and
the memory controller is configured to perform the corresponding memory request to the memory utilizing the second preferred memory page management policy.

6. The system as recited in claim 1, wherein the first indication is specified in source code of the given computer program, or is generated and specified in a compiled version of the given computer program by a compiler.

7. The system as recited in claim 6, wherein the first indication is specified by one of a subset of bits of the first memory access instruction in the given computer program or an opcode of the first memory access instruction.

8. A method comprising:
receiving one or more memory access instructions of a given computer program stored in a memory device, wherein the given computer program includes a first memory access instruction that includes, prior to execution of the given computer program, a first indication of a preferred memory page management policy;

executing the first memory access instruction of the one or more memory access instructions;

generating a first memory request responsive to executing the first memory access instruction, wherein the first memory request includes a second indication of the preferred memory page management policy;

conveying the first memory request to a memory controller; and utilizing the preferred page management policy when accessing a memory for the first memory request.

9. The method as recited in claim 8, further comprising:

retrieving a third indication from a page table entry responsive to executing a second memory access instruction, wherein the third indication specifies a preferred memory page management policy for performing an access to memory corresponding to the second memory access instruction;

conveying the third indication included in the second memory access instruction to the memory controller; and utilizing the preferred memory page management policy specified by the third indication included in the second memory access instruction when performing the access to the memory corresponding to the second instruction.

10. The method as recited in claim 8, further comprising:

programming memory region registers in a memory controller to specify a preferred memory page management policy for each region of the memory;

identifying a region of the memory targeted by a second memory request responsive to receiving the second memory request;

retrieving a preferred memory page management policy from a memory region register corresponding to the region targeted by the second memory request; and performing an access to the memory for the second memory request utilizing the preferred memory page management policy retrieved from the memory region register.

11. The method as recited in claim 8, further comprising:

receiving a fourth indication to dynamically change a memory page management policy subsequent to accessing the memory for the first memory request; and utilizing a second memory page management policy while accessing the memory for a second memory request.

12. The method as recited in claim 8, further comprising:

determining a preferred memory page management policy for a second memory access instruction in the given computer program encoded in an executable binary in the given computer program;

conveying the second preferred memory page management policy with a corresponding memory request to the memory controller; and performing the corresponding memory request to the memory utilizing the second preferred memory page management policy.

13. The method as recited in claim 8, wherein the first indication is specified in source code of the given computer program, or is generated and specified in a compiled version of the given computer program by a compiler.

14. The method as recited in claim 13, wherein the first indication is specified by one of a subset of bits of the first memory access instruction in the given computer program or an opcode of the first memory access instruction.

15. A non-transitory computer readable storage medium storing program instructions, wherein the program instructions are executable by a processor to:

receive one or more memory access instructions of a given computer program stored in a memory device, wherein the given computer program includes a first memory access instruction that includes, prior to execution of the given computer program, a first indication of a preferred memory page management policy;

execute the first memory access instruction of the one or more memory access instructions;

generate a first memory request responsive to executing the first memory access instruction, wherein the first memory request includes a second indication of the preferred memory page management policy;

convey the first memory request to a memory controller; and utilize the preferred page management policy when accessing a memory for the first memory request.

16. The non-transitory computer readable storage medium as recited in claim 15, wherein the program instructions are executable to:

retrieve a third indication from a page table entry responsive to executing a second memory access instruction, wherein the third indication from the page table entry specifies a preferred memory page management policy for performing an access to memory corresponding to the second memory access instruction;

convey the third indication retrieved from the page table entry to the memory controller; and cause the memory controller to use the preferred memory page management policy specified by the third indication retrieved from the page table entry when performing the access to the memory.

17. The non-transitory computer readable storage medium as recited in claim 15, wherein the program instructions are executable to:

program memory region registers in a memory controller to specify a preferred memory page management policy for each region of the memory;

identify a region of the memory targeted by a second memory request responsive to receiving the second memory request;

retrieve a preferred memory page management policy from a memory region register corresponding to the region targeted by the second memory request; and cause a memory controller to perform an access to the memory for the second memory request utilizing the preferred memory page management policy retrieved from the memory region register.

18. The non-transitory computer readable storage medium as recited in claim 15, wherein the program instructions are executable to:

receive a fourth indication to dynamically change a memory page management policy subsequent to accessing the memory for the first memory request; and use a second memory page management policy while accessing the memory for a second memory request.

19. The non-transitory computer readable storage medium as recited in claim 15, wherein the first indication is specified in source code of the given computer program, or is generated and specified in a compiled version of the given computer program by a compiler.

20. The non-transitory computer readable storage medium as recited in claim 19, wherein the first indication is specified by one of a subset of bits of the first memory access instruction in the given computer program or an opcode of the first memory access instruction.

* * * * *